March 6, 1934.   J. C. BUSH   1,949,675
FRUIT JUICE EXTRACTOR
Filed Dec. 13, 1932
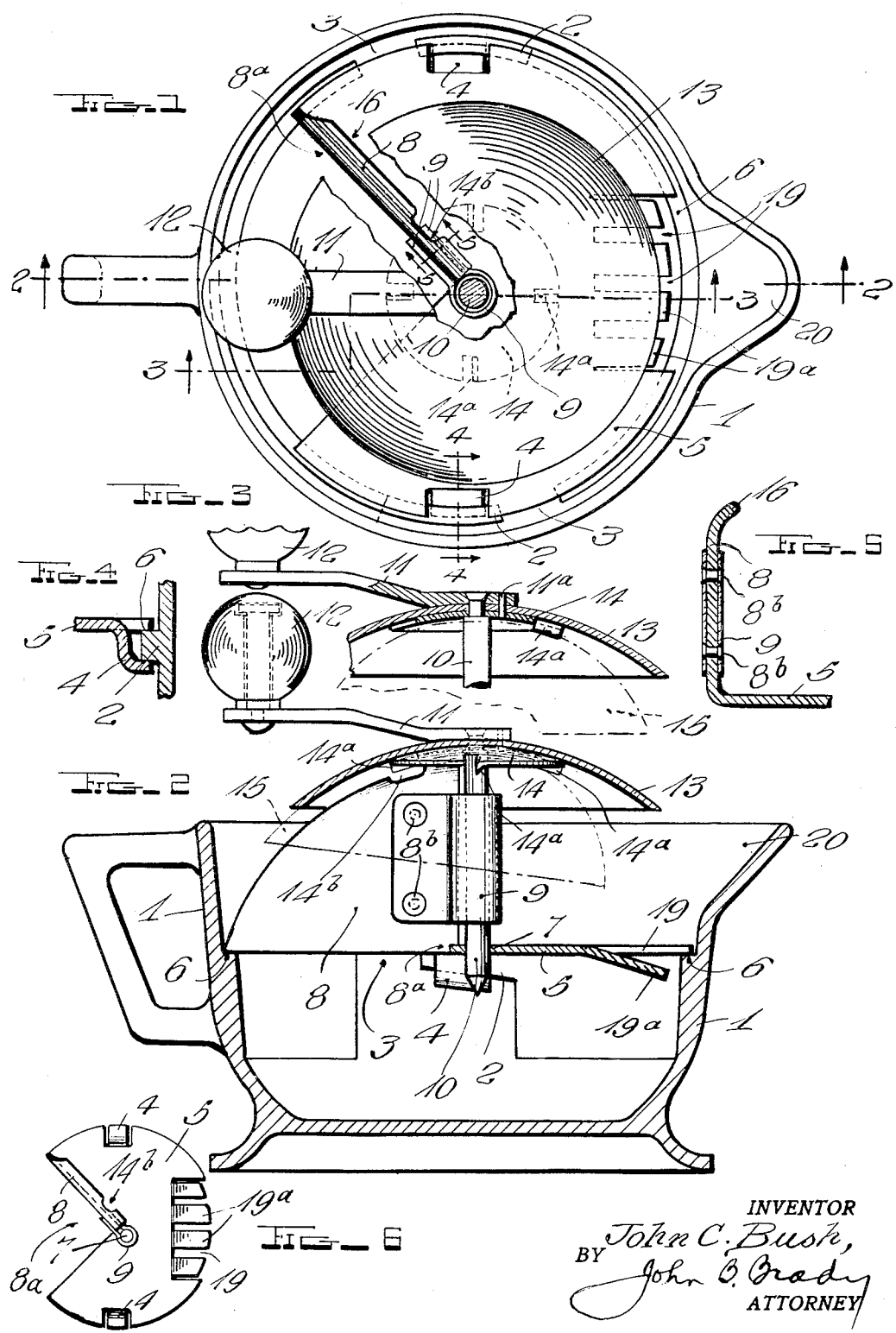
INVENTOR
John C. Bush,
BY John O. Brady
ATTORNEY Patented Mar. 6, 1934

1,949,675

UNITED STATES PATENT OFFICE 1,949,675

FRUIT JUICE EXTRACTOR

John C. Bush, Aliquippa, Pa.

Application December 13, 1932, Serial No. 647,051

11 Claims. (Cl. 146—3)

My invention relates broadly to fruit juice extractors and more particularly to a kitchen and table article for reaming juice from citrus fruits.

One of the objects of my invention is to provide an inexpensive construction of fruit juice extractor which is efficient in its operation and capable of manufacture on a quantity production basis.

Another object of my invention is to provide a construction of fruit juice extractor in which semi-spherical portions of the fruit may be gripped by the rotary element of the extractor and the juice squeezed therefrom by manually rotating the rotary element of the extractor.

Still another object of my invention is to provide a construction of citrus fruit juice extractor comprising a minimum number of parts capable of inexpensive manufacture and assembly wherein a radially extending reaming blade is formed integral with a strainer and adapted to co-act with a rotary element adapted to carry a semi-spherical portion of the citrus fruit upon which the extractor operates.

A further object of my invention is to provide a construction of citrus fruit juice extractor having a pin carrier adapted to be projected through a semi-spherical portion of the citrus fruit and the pin forced downwardly through a socket member centrally of a reaming blade, the fruit being revolvable with respect to the reaming blade for extracting the juice.

A still further object of my invention is to provide a simplified construction of citrus fruit juice extractor wherein citrus fruit after being cut in half may have each half portion thereof successively forced upon a rotatable carrier which is manually operative against a reaming blade in the juice extractor for extracting juice from the citrus fruit.

Other and further objects of my invention reside in the construction of citrus fruit juice extractor as set forth more fully in the specification hereinafter following, by reference to the accompanying drawing, in which:

Figure 1 is a plan view of the fruit juice extractor embodying my invention; Fig. 2 is a cross-sectional view taken through the fruit juice extractor with certain of the parts shown in side elevation; Fig. 3 is a view of the rotatable carrier for the fruit juice extractor shown in a position removed from the juice extractor and with a half portion of fruit carried thereon preparatory to a reaming operation; Fig. 4 is a fragmentary cross-sectional view taken through one of the locking members employed for maintaining the strainer in position with respect to the juice receiver, the view being taken on line 4—4 of Fig. 1; Fig. 5 is a cross-sectional view taken through the remaining blade on line 5—5 of Fig. 1; and Fig. 6 is a plan view of the reamer and strainer unit.

The fruit juice extractor of my invention has been developed with the object of obtaining a simplified construction of juice extractor which can be manufactured inexpensively on a quantity production basis and which will give extended service for the rapid extraction of juice from citrus fruits. The extractor of my invention comprises three elements, that is, a juice receiving receptacle, a strainer with integrally connected reaming blade, and a removable citrus fruit carrier which is adapted to be inserted through a portion of the reaming blade and strainer for pressing the citrus fruit against the reaming blade for rotatably squeezing the juice from the fruit. The citrus fruit carrier is entirely removable from the reaming element and has means therein for gripping the half citrus fruit to insure rotation thereof adjacent the reaming blade. The pin of the carrier projects through the citrus fruit and through a portion of the reaming blade and projects through the strainer as a socket around which the citrus fruit is revolved during the extraction process. I have successfully used the juice extractor of my invention for oranges, grapefruits and lemons.

Referring to the drawing in detail, reference character 1 designates the juice receiving receptacle within which there is formed a pair of inwardly directed bayonet members 2 in diametrically opposite positions. These bayonet members terminate adjacent slots 3 through which the socket members 4 which are attached to laterally extending strainer plate member 5 project. The laterally extending strainer plate 5 is supported on the inwardly directed ledge 6 at the top of the bayonet members 2. The strainer plate 5 has an aperture 7 therein eccentric with respect to the receptacle 1 above which there extends the reamer blade 8 integrally connected with the strainer plate 5 and disposed substantially normal thereto. The reamer plate 8 which is formed from the strainer plate 5 is so bent from the strainer plate 5 that a substantially quadrantal gap 8a is provided for the passage of seeds, pulp and juice of the fruit into the receptacle 1. A central bearing plate 9 is riveted to the central portion of the reamer blade 8 as indicated by rivets 8b for receiving the extended pin 10 of the detachable carrier.

The pin 10 of the detachable carrier is connected with a radially extending arm 11 to which is attached the swivel hand grip 12. The citrus fruit carrier is in the form of a substantially semispherical member 13 having an internally mounted gripper plate 14 therein having teeth 14a which serve to grip a half portion of the citrus fruit in the position shown at 15 in Fig. 3. The arm 11 is secured to the member 13 by means of the pin 10 and also the rivet 11a as shown. Recess 14b allows teeth 14a to freely pass blade 8.

The citrus fruit is first cut in half and one half of the citrus fruit stuck upon the carrier by piercing the fruit with pin 10. The pin projects beyond the lower surface of the citrus fruit and may be projected through the bore in bearing plate 9 adjacent the edge of the reaming blade 8 and through the aperture 7 in the strainer plate 5 for pressing the fruit against the rounded edge 16 of the blade 8. The fruit is reamed against the edge 16 by rotation of the carrier 13 under control of knob 12. The citrus fruit is pressed downwardly by pressure applied to the carrier 13 at the same time that it is revolved against the reaming edge 16. By reason of the flexibility of the skin of the fruit, the contents of the half fruit may be readily reamed to the inner skin and all of the juice and pulp extracted. The strainer plate 5 contains quadrantal aperture 8a through which the fruit juice, pulp and seed from the citrus fruit passes into the receptacle 1 during the reaming process. In order to lock the strainer plate 5 firmly with respect to receptacle 1, the plate is turned to move the socket members 4 into engagement with the bayonet members 2. When it is desired to remove the strainer plate 5 from the receptacle, 1, the strainer plate 5 is twisted to shift socket members 4 to a position in which they may be drawn upwardly in the spaces 3 between the opposite ends of the bayonet members. The strainer plate 5 is provided with peripheral recesses 19 adjacent the pouring edge 20 of the receptacle 1 to permit the pouring of the juice from the receptacle 1 while preventing the passage of pulp or seed. The recesses 19 are formed by slotting plate 5 and pressing the intermediate tongues 19a downwardly as shown. The bayonet members 2 are suitably tapered to insure the wedging of socket members 4 with respect thereto in such manner that the strainer plate 5 may be maintained in locked position with respect to the receptacle 1. In lieu of the bayonet members 2, I may employ simplified tapered lugs adapted to frictionally engage with members carried by the strainer plate 5.

By reason of the eccentric mounting of the fruit carrier with respect to the reaming blade 8, a very effective shearing operation is obtained on the citrus fruit as the rotatable carrier is revolved. As represented in Fig. 2, the citrus fruit is distorted in shape and the interior forced against the reaming blade 8 in a shearing operation which is totally different from the result which will be produced by attempting to force the contents of the citrus fruit against the reaming blade normal to the surface of the reaming blade. The eccentric mounting insures the movement of the citrus fruit against the reaming blade 8 by a shearing action, thereby extracting the juice with minimum pressure exerted upon the control knob 12. The interior of the citrus fruit is actually moved at an angle with respect to the reaming blade for producing a shearing action with respect to the contents of the citrus fruit. The angle at which the contents of the citrus fruit is moved against the reaming blade is of such charactertistic that a direct abutting or opposing resistive action is avoided.

The parts of the extractor are of simple construction. The strainer plate 5 and reaming blade 8 may be cast integral or stamped from sheet metal as shown in the drawing. In this way, the extractor may be formed from the three separable parts, that is, the receptacle, the unit including the strainer plate and reaming blade and the rotatable carrier. These parts are all simple and inexpensive to manufacture on a quantity basis. Inasmuch as the parts are readily separable, the extractor may be readily cleaned and maintained in a sanitary condition.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. A fruit juice extractor, comprising a receptacle, an annular ledge formed interiorly of said receptacle, a strainer plate mounted on said annular ledge, a reamer blade extending upwardly from said strainer plate and a carrier member having a pin projecting therefrom and insertable through a member carried by said reamer blade and said strainer plate, said carrier member providing a support for a half portion of a citrus fruit, and means for imparting rotary movement to said carrier for pressing the citrus fruit against said reamer blade for the extraction of juice therefrom for collection in said receptacle through said strainer plate.

2. In a fruit juice extractor, a receptacle, a strainer plate attachable to and detachable from said receptacle, a reamer blade carried by said strainer plate, a fruit carrier having a pin projectible through a half portion of citrus fruit mounted on said carrer and extendng through a member carried by said reamer blade and said strainer plate, and means for revolving said carrier for pressing the citrus fruit against said reamer blade and extracting juice therefrom for collection in said receptacle through said strainer.

3. A fruit juice extractor, comprising a receptacle, a strainer plate attachable to and removable from said receptacle, a reamer blade integrally connected with said strainer plate and projecting vertically therefrom, and a fruit carrier having a pin projectible through a half portion of a citrus fruit and projectible through a socket carried by said reamer blade and said strainer plate, and means for rotatably driving said carrier pressing the citrus fruit against said reamer blade for extracting juice therefrom through said strainer plate.

4. A fruit juice extractor, comprising a receptacle, having a laterally disposed shoulder therein, a strainer plate supportable at its periphery on said shoulder, bayonet members at diametrically opposite positions in said receptacle immediately adjacent said shoulder, a reamer blade integrally connected with said strainer plate, said reamer blade extending from the center of said strainer plate radially toward the periphery of said strainer plate, said reamer blade being formed on a curve substantially conforming to the shape of a half portion of a citrus fruit, a carrier for supporting a half portion of a citrus fruit, said carrier having a pin extending therethrough and piercing the half portion of the citrus fruit supported by said carrier, said pin being projectible through a bore extending vertically through a member carried by said reamer blade and through said strainer plate for rotatably pressing the citrus fruit against said reamer blade and extracting juice therefrom for collection in said receptacle through said strainer plate.

5. A fruit juice extractor comprising a receptacle, a strainer plate disposed laterally in said receptacle, means carried by opposite peripheral edges of said strainer plate for locking said strainer plate within said receptacle, a reamer blade integrally connected with said strainer plate, a detachable carrier including a semi-spherical member and a downwardly depending central pin, said pin being adapted to project through a socket formed in a member carried by said reamer blade and through an aperture in said strainer plate, and means for rotatably driving said carrier for pressing a citrus fruit against said reamer blade for extracting juice therefrom for collection in said receptacle below said strainer plate.

6. A fruit juice extractor, comprising a receptacle, a strainer plate extending laterally of said receptacle, means for locking said strainer plate with said receptacle, a reamer blade formed integral with said strainer plate and extending radially from the periphery of said strainer plate to the center thereof, said reamer blade forming substantially the segment of the surface, a rotatable carrier including a substantially semi-spherical portion and a central pin projecting therethrough and insertable through a socket formed in a member carried by said reamer blade, gripping faces mounted adjacent the interior of said semi-spherical member, said pin and gripping faces being projectible into the citrus fruit for mounting the citrus fruit in position for the extraction of juice by the rotatable movement of said semi-spherical member with respect to said reamer blade.

7. In a fruit juice extractor, a reamer blade, a member connected therewith and having a socket formed therein, a rotatable carrier for a half portion of a citrus fruit, said rotatable carrier comprising a substantially semi-spherical device, a pin projecting downwardly through the center of said device, an arm connected with said pin and extending radially therefrom, a hand grip on the end of said arm, and means projecting from the interior of said device for gripping a half citrus fruit with said pin projecting through the socket in the member connected with said reamer blade for effecting a juice extracting operation by rotatably driving said hand grip.

8. A fruit juice extractor comprising a receptacle, a laterally extending ledge formed interiorly of said receptacle, a plate member having a horizontally extending portion adapted to engage said ledge and an upstruck portion, a strip member secured to opposite sides of the edge of said upstruck portion, said strip member forming a vertically disposed bore, a carrier for a hemispherical portion of a citrus fruit, said carrier having a central pin extending therethrough, said pin being formed to extend through the bore formed by said strip member for providing a mounting for said citrus fruit carrier.

9. A fruit juice extractor comprising a receptacle, a plate removably mounted in said receptacle, said plate including a horizontally extending portion and a vertically extending portion, a strip attached to said vertically extending portion providing a socket disposed on a vertical axis, a carrier for a half portion of a citrus fruit, said carrier including a rotatable member, a pin extending downwardly from the center of said rotatable member and projectible through said socket, and a disc attached to the under surface of said rotatable member, said disc having gripping teeth formed therein adapted to engage and secure the half portion of the citrus fruit for simultaneous rotation with said rotatable member.

10. A citrus fruit juice extractor comprising a receptacle, a plate disposed laterally within said receptacle, said plate having an upstanding reaming blade thereon and a socket eccentric with respect to said receptacle, a citrus fruit carrier containing a central pin projecting downwardly through the socket in said plate, said carrier being rotatable for moving the citrus fruit carried thereby at an angle to the surface of said reaming blade for extracting juice from said fruit by a shearing action.

11. In a citrus fruit juice extractor, a receptacle, a laterally disposed plate mounted in said receptacle, said plate having a portion thereof upstruck and formed into a reaming blade extending from the edge of the plate to a position eccentric with respect to the center of said receptacle, a socket carried by said reaming blade eccentric with respect to said receptacle, a citrus fruit carrier comprising a hemispherical member, a pin disposed centrally thereof, a crank connected to the upper end of said pin, said pin being projectible through the socket connected with said reaming blade for forcing the citrus fruit against said reaming blade at an angle for producing a shearing operation upon the contents of the citrus fruit in the process of extracting juice therefrom.

JOHN C. BUSH.